(12) United States Patent
Reubeni

(10) Patent No.: US 10,863,731 B2
(45) Date of Patent: Dec. 15, 2020

(54) FISHING REEL

(71) Applicant: ABBECAN INDUSTRIES INC., Concord (CA)

(72) Inventor: Benjamin N. Reubeni, Thornhill (CA)

(73) Assignee: ABBECAN INDUSTRIES INC.

( * ) Notice: Subject to any disclaimer, the term of this patent is extended or adjusted under 35 U.S.C. 154(b) by 112 days.

(21) Appl. No.: 16/092,844

(22) PCT Filed: Apr. 11, 2017

(86) PCT No.: PCT/CA2017/050446
§ 371 (c)(1),
(2) Date: Oct. 11, 2018

(87) PCT Pub. No.: WO2017/177325
PCT Pub. Date: Oct. 19, 2017

(65) Prior Publication Data
US 2019/0124902 A1 May 2, 2019

Related U.S. Application Data

(60) Provisional application No. 62/321,733, filed on Apr. 12, 2016, provisional application No. 62/453,283, filed on Feb. 1, 2017.

(51) Int. Cl.
*A01K 89/01* (2006.01)
*A01K 89/015* (2006.01)
(Continued)

(52) U.S. Cl.
CPC ........ *A01K 89/0186* (2015.05); *A01K 89/016* (2013.01); *A01K 89/01931* (2015.05); *A01K 89/052* (2015.05); *A01K 89/058* (2015.05)

(58) Field of Classification Search
CPC .............. A01K 89/016; A01K 89/0179; A01K 89/0181; A01K 89/051; A01K 89/058; A01K 89/059
See application file for complete search history.

(56) References Cited

U.S. PATENT DOCUMENTS 3,478,976 A * 11/1969 Sarah ................... A01K 89/016
242/270
3,478,977 A * 11/1969 Sarah ................. A01K 89/0162
242/270

(Continued)

OTHER PUBLICATIONS

International Search Report and Written Opinion for PCT/CA2017/050446 dated Jul. 24, 2017.

*Primary Examiner* — Emmanuel M Marcelo
(74) *Attorney, Agent, or Firm* — Millman IP Inc.

(57) ABSTRACT

In an aspect, provided is a fishing reel having a backplate that is mountable to a fishing rod and a spool rotatably mounted to the backplate. The spool has a circumferentially-extending line storage channel configured for storage of fishing line. The fishing reel includes a friction mechanism including at least one rotatable friction surface rotatable with the spool and engageable with a stationary friction surface during rotation of the spool relative to the backplate, and provides an actuator arm that is movable between first and second positions. In the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction.

23 Claims, 18 Drawing Sheets

(51) Int. Cl.
    *A01K 89/033*     (2006.01)
    *A01K 89/016*     (2006.01)

(56)             References Cited

U.S. PATENT DOCUMENTS

| | | | | |
|---|---|---|---|---|
| 4,049,217 | A * | 9/1977 | Koopman | A01K 89/016 |
| | | | | 242/249 |
| 4,482,106 | A * | 11/1984 | Kovalovsky | A01K 89/0181 |
| | | | | 242/258 |
| 4,657,201 | A * | 4/1987 | Munroe | A01K 89/016 |
| | | | | 242/265 |
| 4,733,830 | A * | 3/1988 | Hollander | A01K 89/016 |
| | | | | 242/292 |
| 5,475,944 | A * | 12/1995 | Mathews | A01K 91/18 |
| | | | | 242/397.1 |
| 5,921,492 | A * | 7/1999 | Bauer | A01K 89/016 |
| | | | | 242/295 |
| 6,012,665 | A * | 1/2000 | Olona | A01K 89/012 |
| | | | | 242/250 |
| 6,076,640 | A * | 6/2000 | Carlson | A01K 89/016 |
| | | | | 188/82.1 |
| 6,513,743 | B1 * | 2/2003 | Perkins, Jr. | A01K 89/016 |
| | | | | 242/295 |
| 7,168,647 | B1 | 1/2007 | Kang | |
| 2010/0025513 | A1 * | 2/2010 | Lee | A01K 89/058 |
| | | | | 242/295 |
| 2010/0181406 | A1 * | 7/2010 | Kang | A01K 89/01931 |
| | | | | 242/267 |
| 2014/0151484 | A1 * | 6/2014 | Header | A01K 89/016 |
| | | | | 242/295 |
| 2015/0053806 | A1 | 2/2015 | Geisel | |
| 2016/0286774 | A1 * | 10/2016 | Champion | A01K 89/006 |

\* cited by examiner

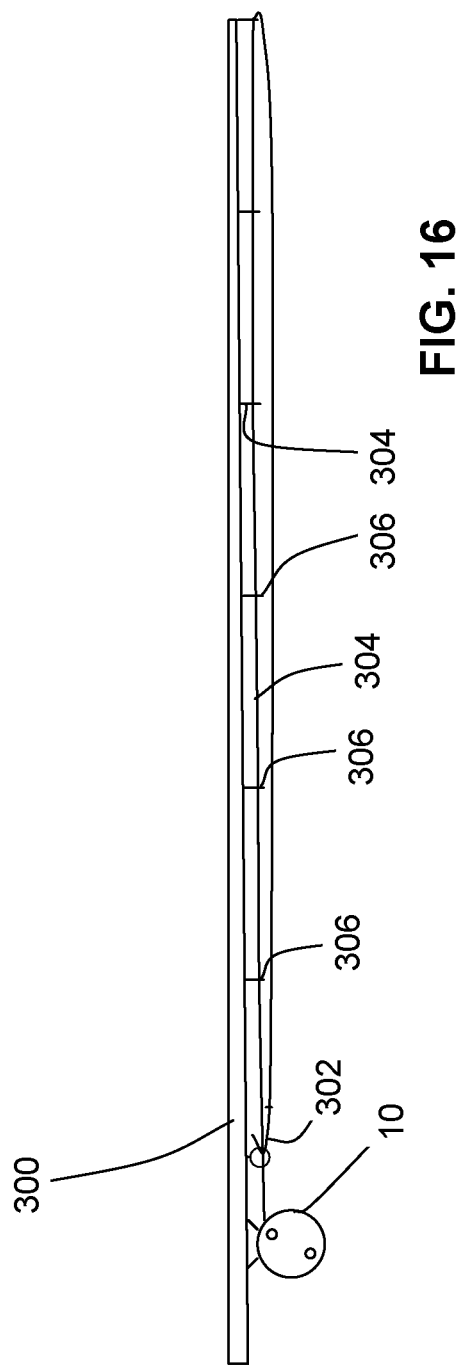

FISHING REEL

CROSS-REFERENCE TO RELATED APPLICATIONS

This application claims the benefit of U.S. Provisional Application No. 62/321,733 filed Apr. 12, 2016 and U.S. Provisional Application No. 62/453,283 filed Feb. 1, 2017, the contents of both which are incorporated herein by reference in their entirety.

FIELD

The present disclosure relates to the field of fishing equipment, and in particular to a fishing spool having a disengageable drag mechanism.

BACKGROUND OF THE DISCLOSURE

The art of fishing has evolved considerably over the past century, and a variety of fishing rod and spool combinations have developed. In general, the primary categories of rod/spool combinations can be summarized as follows: spin-casting, bait-casting, fly-casting, spinning, trolling and center-pinning.

The center-pinning category of rod/spool combinations uses a specialized free rotation spool that delivers a fishing line from a spool that rotates with very little friction. This permits for a very smooth payout of fishing line, over considerable distances, providing a superior and natural presentation of bait.

Center-pin spools do not provide a drag mechanism, as they traditionally rely on the angler to 'palm' the spool, providing drag when required with the angler's palm. While this technique is effective and satisfying to use, as it provides superior line control, it is notoriously difficult to master.

Drag systems on fishing spools, in particular spin-casting and bait-casting are known, and provide the angler with a variety of line control options. The extent of the drag applied to line payout can be varied, and adjusted for the conditions and species being targeted.

It would be desirable to provide a fishing spool having the superior performance characteristics of a center-pin spool, with a drag mechanism that does not rely on the angler to learn or apply the 'palming' method.

SUMMARY OF THE DISCLOSURE

In an aspect of the present disclosure, provided is a fishing reel. The fishing reel comprises a backplate that is mountable to a fishing rod and a spool that is rotatably mounted to the backplate. The spool has a circumferentially-extending line storage channel configured for storage of fishing line. The fishing reel includes a friction mechanism including at least one rotatable friction surface that is rotatable with the spool and that is engageable with a stationary friction surface during rotation of the spool relative to the backplate, and provides an actuator arm that is movable between a first position and a second position, wherein in the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction.

In another aspect, a fishing reel is provided and includes a backplate that is mountable to a fishing rod, a spool that is rotatably mounted to the backplate, and an actuator arm. The spool has a circumferentially-extending line storage channel configured for storage of fishing line. The actuator arm is movable between a locking position, a drag position and a free rotation position. In the locking position, the actuator arm prevents rotation of the spool in a pay out direction. In the drag position, the actuator arm permits rotation of the spool in a pay out direction with a first resistance. In the free rotation position, the actuator arm permits rotation of the spool in the pay out direction with a second resistance that is lower than the first resistance.

Additionally, other aspects of the present disclosure are novel and inventive and are intended to be protected.

BRIEF DESCRIPTION OF THE DRAWINGS

The foregoing and other features and advantages will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

FIG. 16 is an elevation view of a fishing rod in accordance with an embodiment of the present disclosure.

DETAILED DESCRIPTION

Specific embodiments of the present disclosure are now described with reference to the figures, wherein like reference numbers indicate identical or functionally similar elements. The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Figure 1:
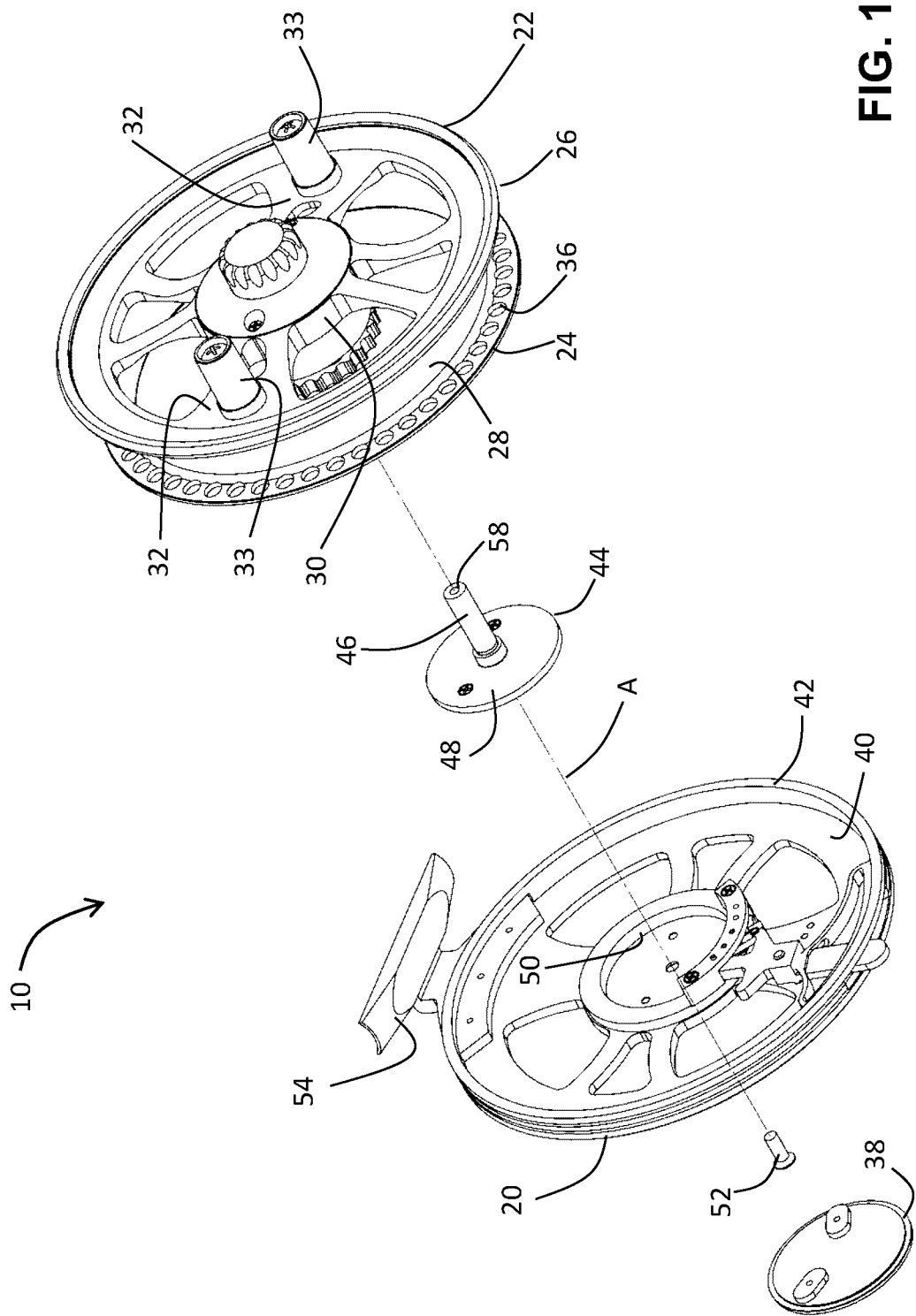
FIG. 1 is a partially exploded perspective view of the fishing reel shown in a right-handed configuration, in accordance with an embodiment of the disclosure.

Referring now to FIG. 1, shown is a partially exploded perspective view illustrating various components of a fishing reel 10. The fishing reel 10 includes a backplate 20 that is mountable to a fishing rod, and a spool 22 that is mounted upon the backplate 20 and is rotatable about an axis A. The spool 22 includes a circumferentially-extending line storage channel defined by a first flange wall 24, a second flange wall 26, and a bottom channel wall 28. The spool 22 further includes a hub 30 to facilitate the mounting of the spool 22, upon the backplate 20, and a plurality of radial supports 32 that support the circumferentially-extending line storage channel upon the hub 30. At least one of the radial supports 32 provides a handle 33 to enable a user to rotate the spool 22 during use. As shown, two handles 33 are provided on generally diametrically opposed radial supports 32. Each handle 33 may include a sleeve 34 having a selected appearance, which is rotatably supported on a handle post 35 that is fixedly fastened to one of the radial supports 32 via a threaded fastener 37. A suitable seat member 39 and a second threaded fastener 41 may be provided to capture the handle between the head of the fastener 37 and the handle 33.

The circumferentially-extending line storage channel, the hub 30 and the plurality of radial supports 32 may be of unitary construction, or may be separately formed and assembled into the arrangement shown. At least one of the first and second flange walls 24 and 26 may contain a plurality of drainage apertures 36 positioned to permit the drainage of liquids from within the spool 22 to an exterior of the spool 22. The bottom channel wall 28 may also provide a plurality of drainage apertures (not shown) to further permit the drainage of liquids from within the spool 22.

The backplate 20 includes a back plate 40 and a circumferentially-extending backplate edge wall 42. The backplate 20 supports a spindle 44 having a shaft portion 46 and a plate portion 48. The plate portion 48 is mountable in a seat 50 in the backplate 20, and may be retained upon the backplate by press-fit, or through the use of a suitable fastener 52 (i.e. a threaded fastener). The spindle 44 defines the axis of rotation A, and supports the rotatable spool 22 upon the backplate 20. The backplate 20 also provides a bracket 54 (also referred to as a foot 54) for mounting the backplate 20, and thereby the fishing reel 10, to a suitable fishing rod, in a manner that is known in the field of fishing equipment. The spool 22 is retained upon the backplate 20 using a suitable fastener 56 (see FIG. 2) which engages an inside thread 58 provided on the shaft portion 46 of the spindle 44. The fishing reel 10 may also include a name plate 38 for engraving or manufacturing details, the name plate 38 being affixed to the backplate 20 using suitable fasteners.

Figure 2:
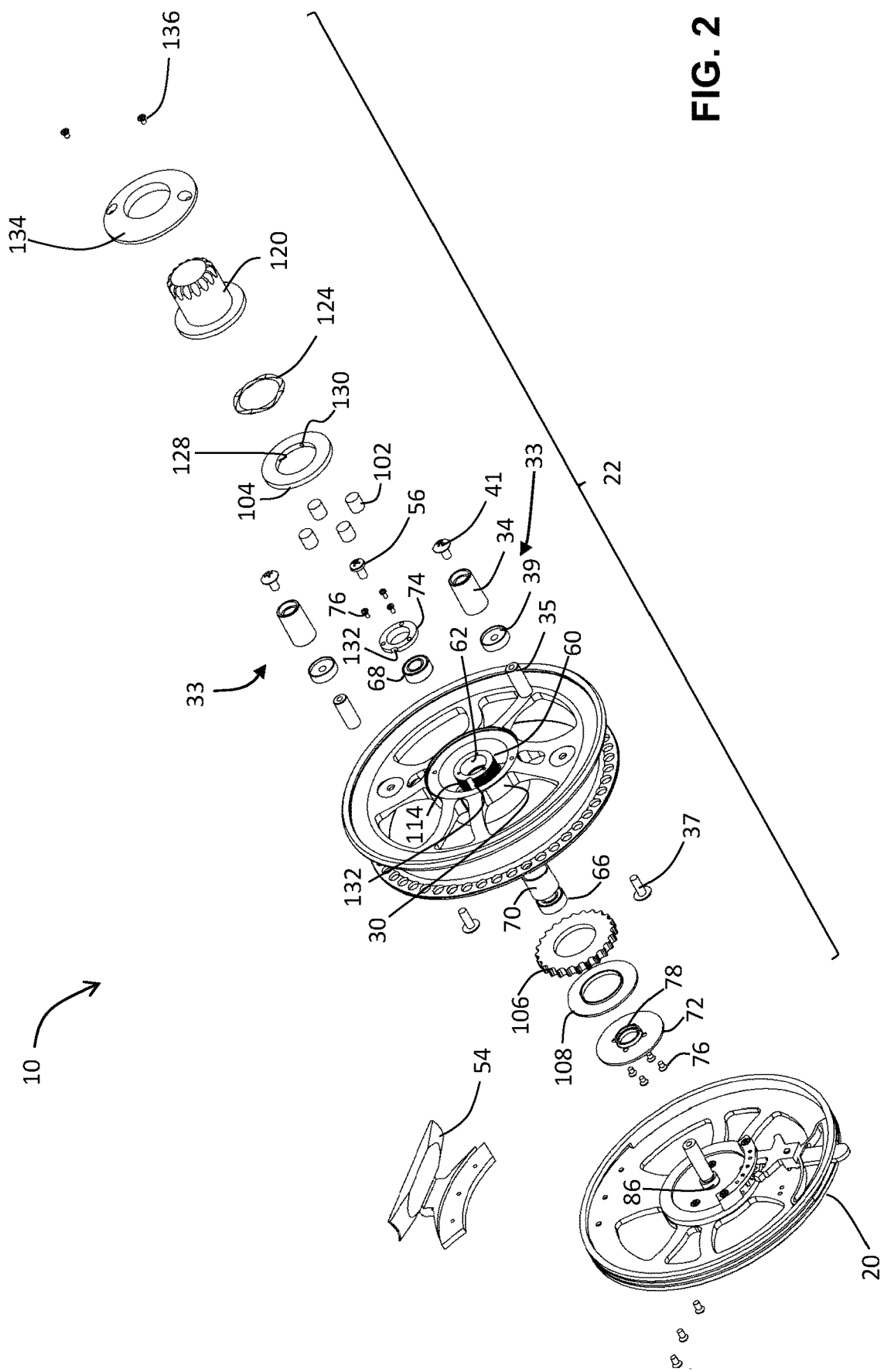
FIG. 2 is an exploded perspective view of the fishing reel according to the embodiment of FIG. 1.
Figure 3:
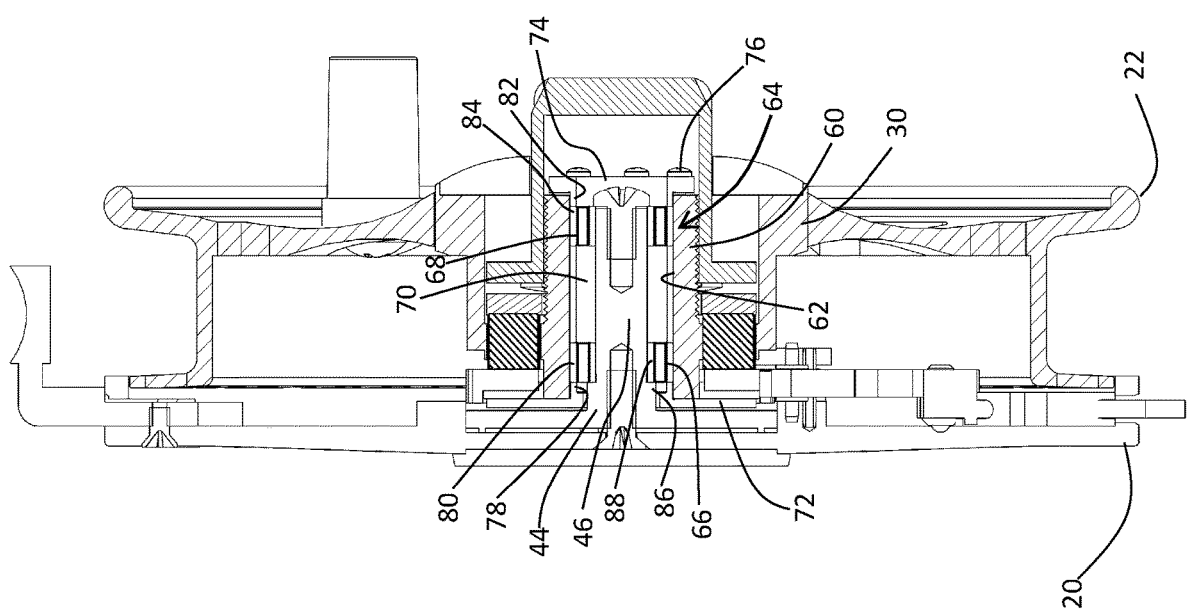
FIG. 3 is a side sectional view of the fishing reel according to the embodiment of FIG. 1.

Having regard to FIGS. 2 and 3, the hub 30 provides a bearing housing 60 which supports on an inside surface 62 a bearing assembly 64 which mounts upon the shaft portion 46 of the spindle 44. The bearing assembly includes a first bearing 66, a second bearing 68, and a bearing spacer 70 arranged therebetween. The first and second bearings 66 and 68 and the spacer 70 are axially aligned and retained within the bearing housing 60 by a first clamping member 72 on a first side of the hub 30, and a second clamping member 74 on a second side of the hub 30. The first and second clamping members 72 and 74 are retained on the bearing housing 60 using suitable fasteners 76. The first clamping member 72 provides an axial flange 78 that aligns to an outer race 80 of the first bearing 66. Similarly, the second clamping member 74 provides an axial flange 82 that aligns to an outer race 84 of the second bearing 68. The axial flanges 78 and 82 are sized such that when assembled, the first and second clamping members 72 and 74 engage but do not exert an axial load upon the bearing assembly 64. As shown, the shaft portion 46 of the spindle 44 has at least a selected concentricity configured to support the first bearing 66, the second bearing 68, and the bearing spacer 70. The shaft portion 46 also provides a shoulder 86 which engages an inner race 88 of the first bearing 66.

Figure 3A:
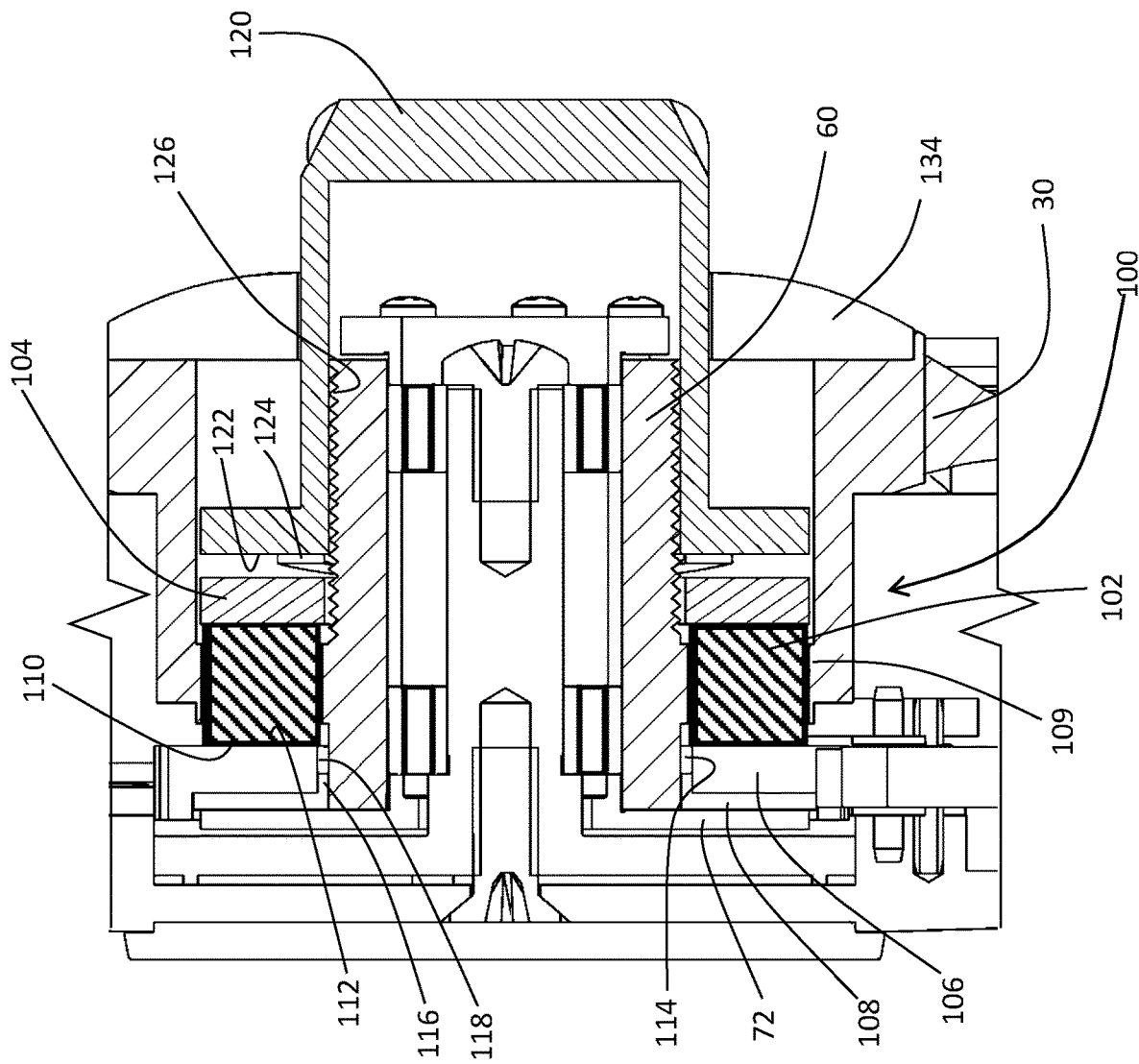
FIG. 3a is a partial side section view of the fishing reel according to the embodiment of FIG. 1, showing aspects of the friction mechanism.

The spool 22 includes a drag system to impart a selectable amount of drag upon the spool 22 during rotation of the spool 22 relative to the backplate 20. With reference now to FIG. 3a, the drag system includes a friction mechanism 100 having a plurality of drag pins 102 and a drag pin cover plate 104 arranged on the second side of the hub 30, and a selectively lockable rotatable drag gear 106 and friction washer 108 arranged on the first side of the hub 30. The plurality of drag pins 102 are arranged to extend through respective corresponding apertures 109 in the hub 30, to engage the drag pin cover plate 104 on the second side of the hub 30, and the drag gear 106 on the first side of the hub 30. With this arrangement, each of the drag pins 102 is said to present a friction surface 110 that is rotatable with the spool 22, and that is engageable with a friction surface 112 provided on the drag gear 106 during rotation of the spool 22 relative to the backplate 20. As shown, on the first side of the hub 30, the drag gear 106 and friction washer 108 are retained on an outside surface 114 of the bearing housing 60 by the first clamping member 72. The friction washer 108 is provided with an axial flange 116 that seats between the outside surface 114 of the bearing housing 60 and an inside surface 118 of the drag gear 106, therein concentrically aligning the drag gear 106 relative to the bearing housing 60. The drag gear 106 also presents a counterbore in which the friction washer 108 and first clamping member 72 are seated. It will be appreciated that while four drag pins 102 are shown, the drag system may be configured to use a greater number or a fewer number of drag pins as required. For example, the drag system may be configured to use 8 drag pins. It will also be appreciated that the drag pins 102 and/or friction washer 108 may be formed of any suitable polymeric composition including but not limited to engineering thermoplastics (i.e. Delrin).

The drag system is also provided with an adjustment member that is moveable to adjust a friction force applied between the friction surface 110 that is rotatable with the spool 22 and the friction surface 112 provided on the drag gear 106. The adjustment member is provided in the form of a rotatable tension knob 120 that is moveable in a first direction to increase the applied friction force, and in a second direction to decrease the applied friction force. When moved in the first direction, an engagement surface 122 on the tension knob 120 applies a compressive force upon the drag pin cover plate 104 through the intermediate action of a wave washer 124. This compressive force serves to drive the drag pin cover plate 104 and therein the drag pins 102 towards the opposing friction surface 112 of the drag gear 106, thereby increasing the friction forces therebetween. When moved in the second direction, the compressive forces are reduced, thus resulting in an opposite effect, that is a decrease in the friction forces therebetween.

Figure 4:
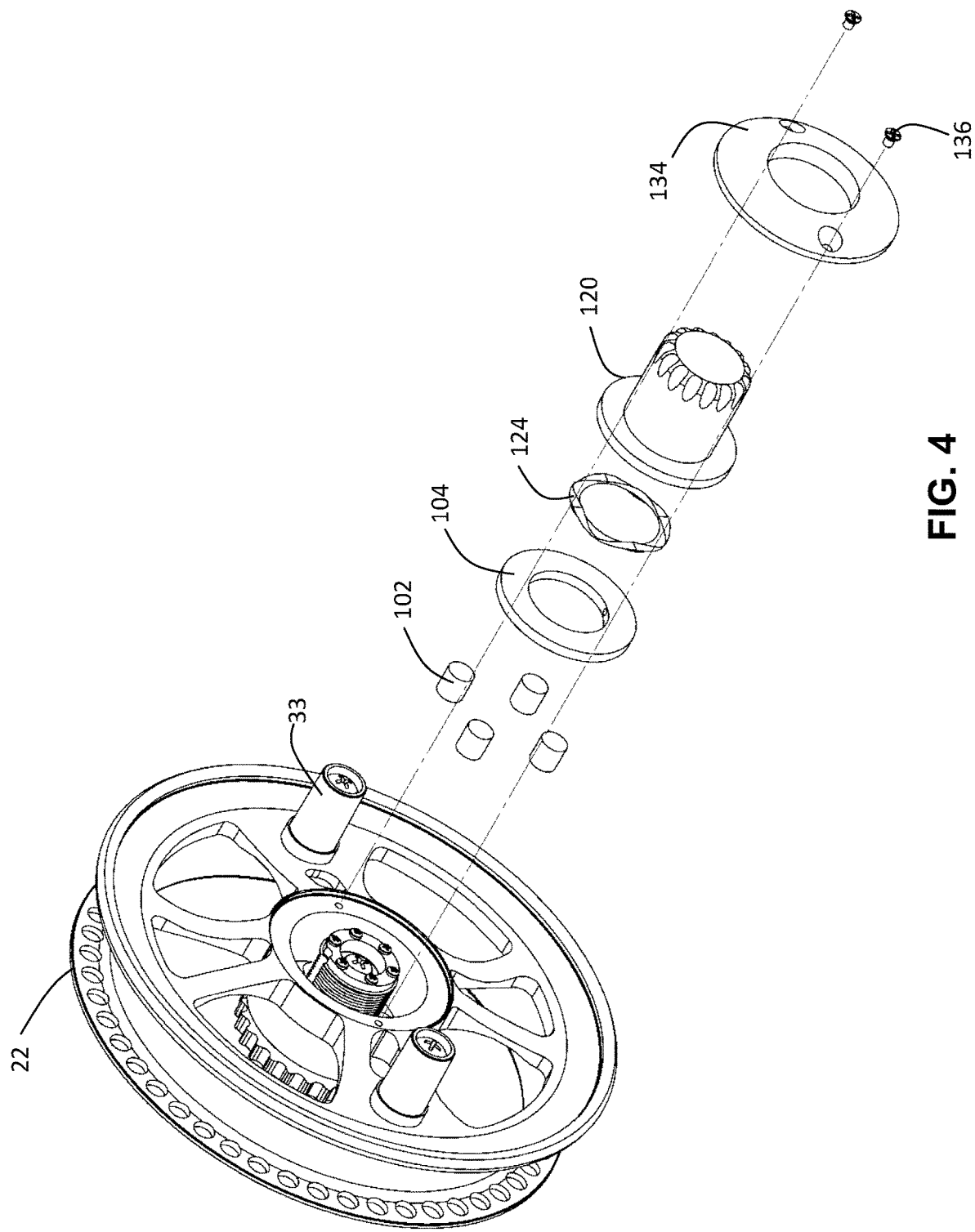
FIG. 4 is a partially exploded perspective view of the rotatable spool of the fishing reel according to the embodiment of FIG. 1.

As shown, the tension knob 120 is provided with a threaded inside surface 126 configured to engage corresponding threads provided on the outside surface 114 of the bearing housing 60 on the second side of the hub 30. Moving the tension knob 120 in the first and second directions is achieved by applying the appropriate rotation to the tension knob 120. To prevent the drag pin cover plate 104 from rotating relative to the spool 22, that is during rotation of the tension knob 120, and to ensure generally linear pressure is applied to the drag pins 102, an inside surface 128 of the drag pin cover plate 104 is provided with one or more an anti-rotation pins 130 (see FIG. 2) that cooperate with a corresponding notch 132 provided on the outside surface 114 of the bearing housing 60. Note that the pin 130 cooperating with the notch 132 as labelled is not visible in the views shown. The second clamping member 74 is also provided with the notch 132. As such, the drag pin cover plate 104 is prevented from rotating relative to the bearing housing 60 and thus the spool 22. To prevent the tension knob 120 from becoming fully unthreaded and thus detached from the hub 30, a retaining plate 134 may be provided (as seen for example in FIG. 4), the retaining plate 134 being affixed to the hub 30 using suitable fasteners 136. As shown, the tension knob 120 is provided with a knurled geometry to improve finger grip during use.

The drag gear 106 is lockable to enable the drag system to be selectively engaged/disengaged. To engage the drag system, the drag gear 106 is locked in position, that is it is prevented from rotating with the spool 22, therein presenting the friction surface 112 as a stationary friction surface. Unlocking the drag gear 106 allows the friction surface 112 of the drag gear 106 to rotate with the spool 22 and therein the drag pins 102, thus preventing the development of frictional forces between friction surfaces 110 and 112 of the respective drag pins 102 and drag gear 106.

In the embodiment shown in FIGS. 5 through 7a (arranged for right-handed operation), a locking assembly is provided to selectively lock the drag gear 106 as required. The locking assembly includes an actuator arm 140 pivotally mounted on the backplate 20. The actuator arm 140 cooperates with a pawl 142 configured to engage the drag gear 106 mounted on the spool 22. The actuator arm 140 is moveable between a first position (as shown in dashed lines in FIGS. 6 through 7a) and a second position (as shown in solid lines in FIGS. 6 through 7a), wherein in the first position, the actuator arm disengages the friction mechanism to permit free rotation of the spool 22 relative to the backplate 20, and in the second position, the actuator arm actuates the friction mechanism to cause frictional engagement between the rotatable friction surface 110 of the drag pins 102 and the stationary friction surface 112 of the drag gear 106. The first position may be referred to as a free-rotation position and the second position may be referred to as a drag position.

The actuator arm 140 controls the position of the pawl 142, such that when the actuator arm 140 is in the second position, the pawl 142 is engaged with the drag gear 106 (see FIGS. 7 and 7a; shown in solid lines) preventing rotation of the drag gear 106 in at least a first rotational direction D1. When the actuator arm 140 is in the first position, the pawl 142 is spaced-apart from the drag gear 106 (see FIGS. 7 and 7a; shown in dashed lines), thereby permitting the drag gear 106 to rotate with the spool 22. Preventing rotation of the drag gear 106 results in frictional engagement between the rotatable friction surface 110 of the drag pins 102 and the stationary friction surface 112 of the drag gear 106 during rotation of the spool 22 in the first rotational direction. As presented, the locking assembly is presented as having a ratcheting action, wherein upon engaging the friction mechanism, the spool 22 and drag gear 106 are able to rotate in a second rotational direction D2 opposite to the first rotational direction. Accordingly, with the friction mechanism engaged, the spool 22 is rotatable in the first rotational direction D1 with applied drag arising from the friction mechanism, and is additionally rotatable in the second rotational direction D2 generally free of applied drag, as would be required when retrieving the line (i.e. when reeling in a fish).

Figure 5:
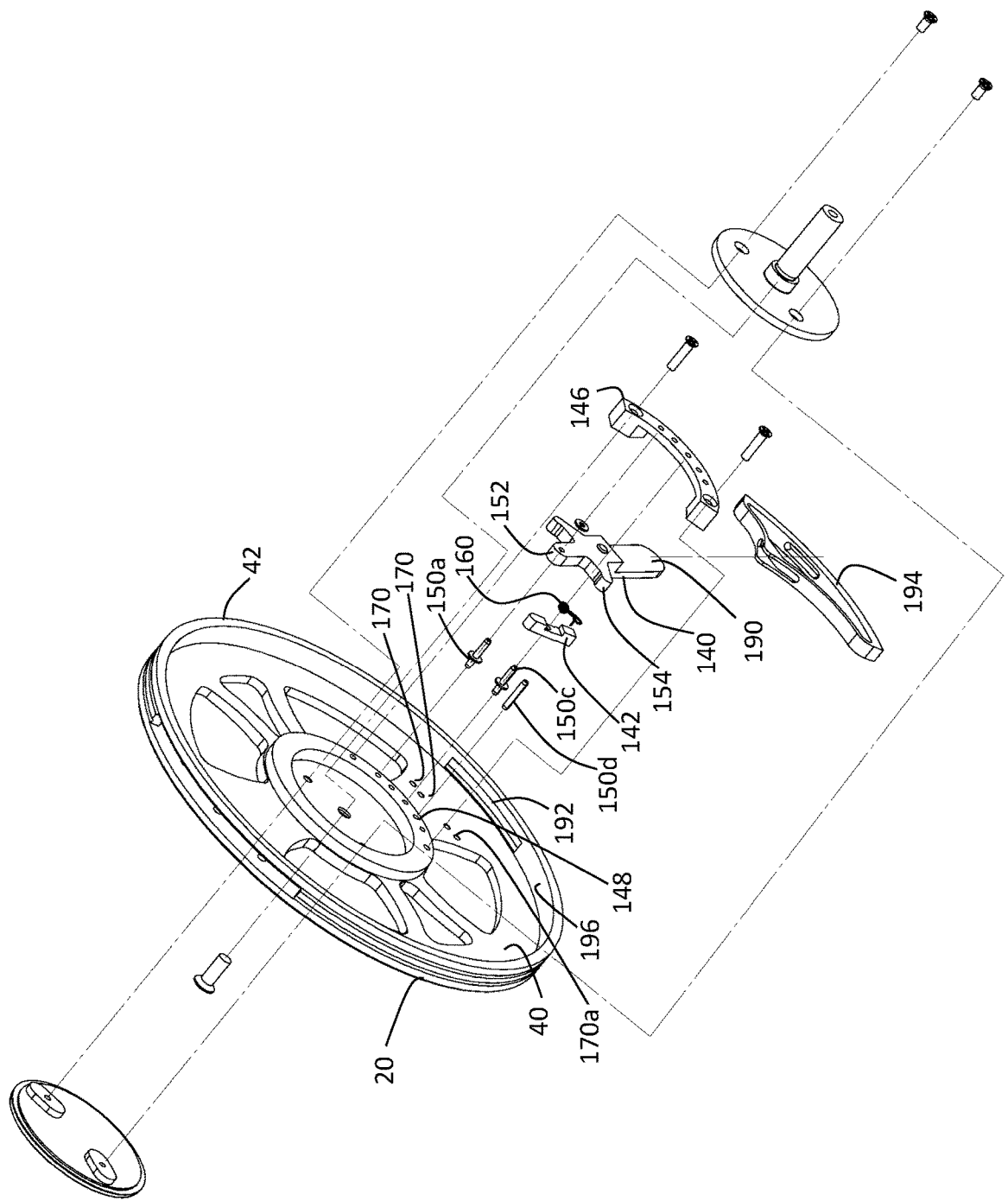
FIG. 5 is an exploded perspective view of the backplate of the fishing reel according to the embodiment of FIG. 1.
Figure 6:
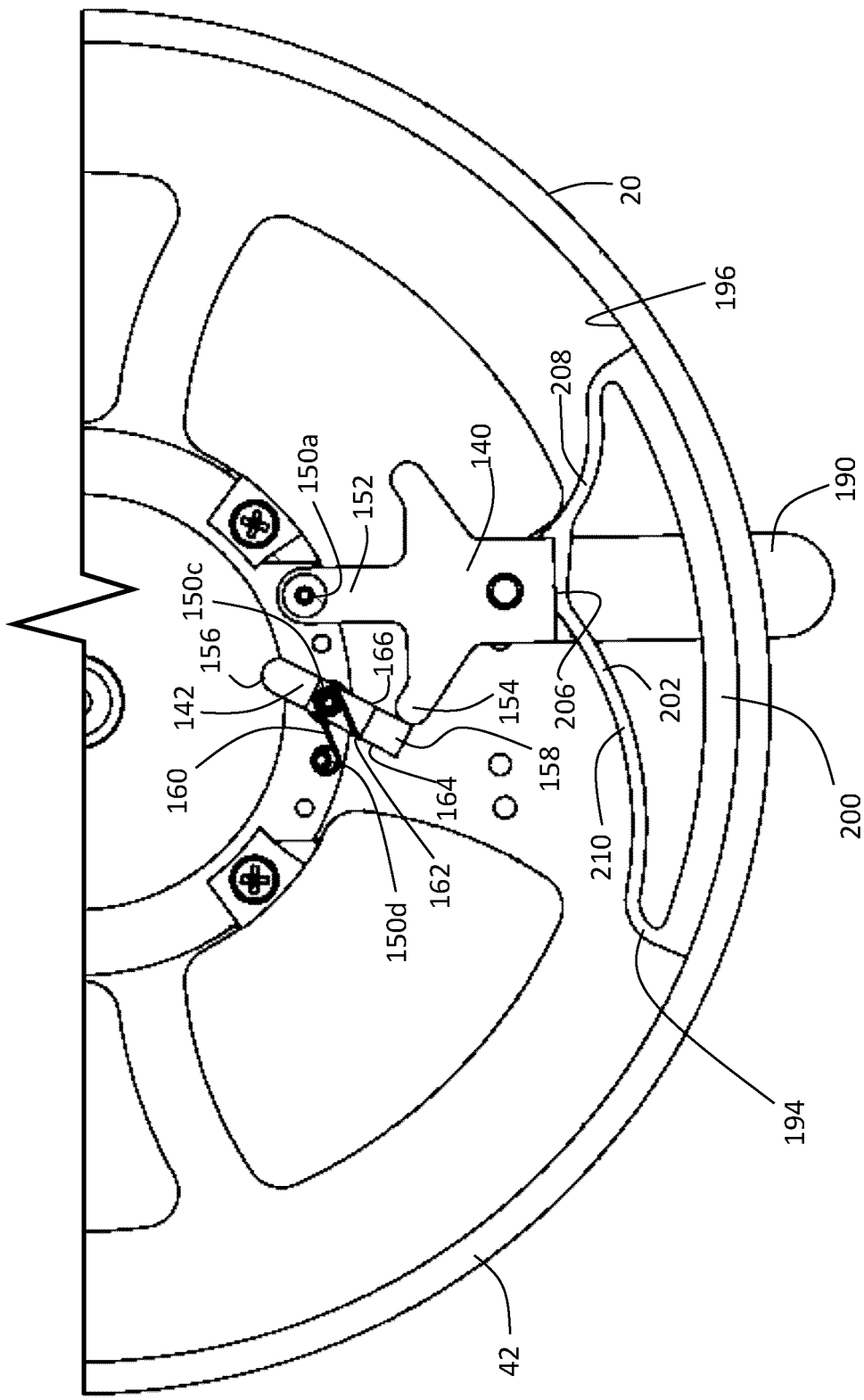
FIG. 6 is a partial front view of the backplate of the fishing reel according to the embodiment of FIG. 1, showing aspects of the locking assembly.
Figure 7:
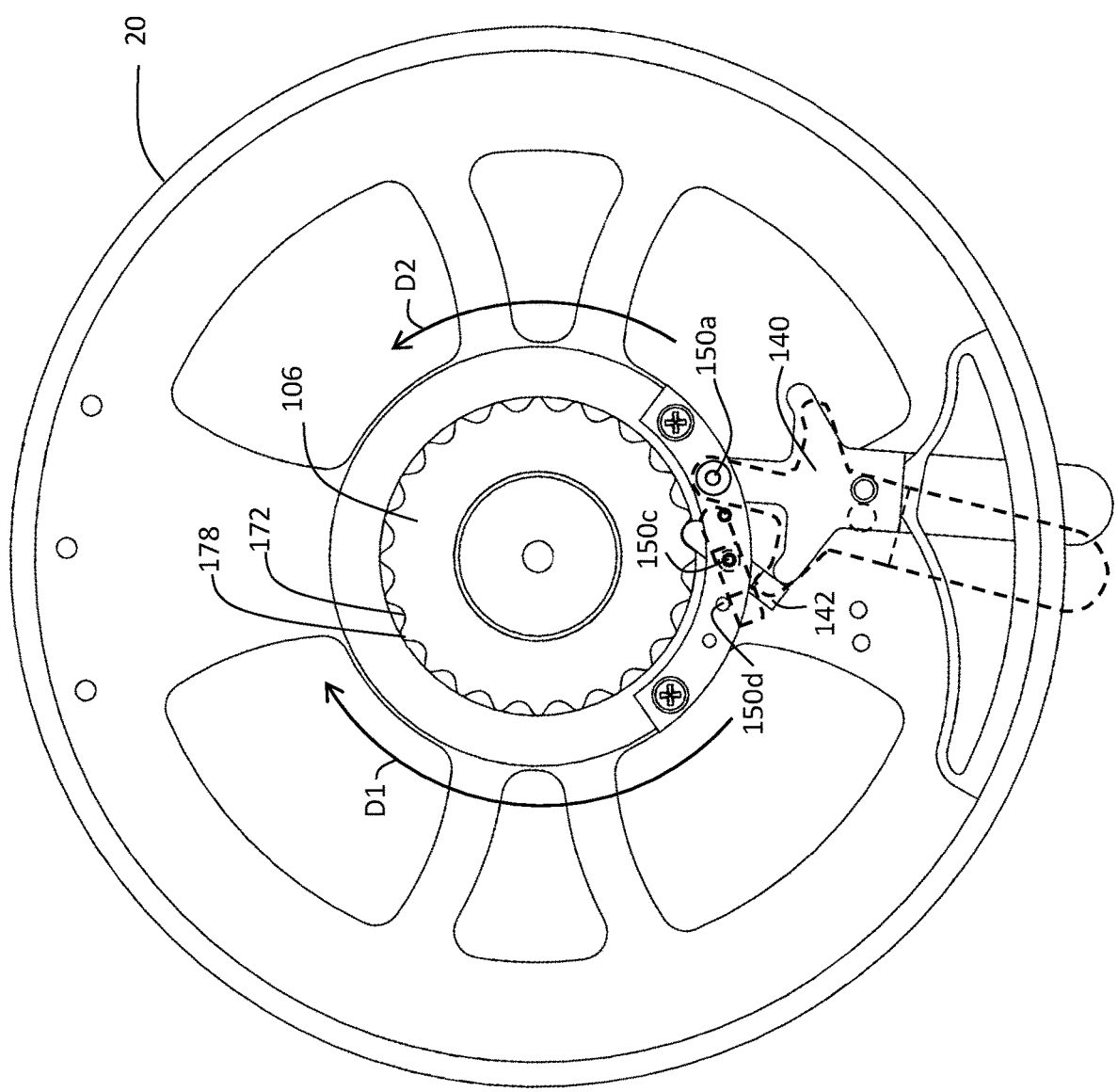
FIG. 7 is a front view of the backplate of the fishing reel according to the embodiment of FIG. 1, showing the relationship between the drag gear of the rotatable spool, and the locking assembly in the first and second positions.

Having regard to FIG. 5, the backplate 20 provides a mount bridge 146 which cooperates with a mount strip 148 provided on the back plate 40 to operably mount the actuator arm 140 and the pawl 142 thereto. The mount bridge 146 and the mount strip 148 cooperate to support a series of mounting posts 150a, 150b, 150c, 150d and 150e (collectively mounting posts 150; mounting posts 150b and 150e are not used in the configuration shown in FIG. 5) to receive the actuator arm 140 and the pawl 142. The mounting posts 150 are dimensioned to permit the required pivotability of the actuator arm 140 and the pawl 142 during use of the locking assembly. The pivotability of the actuator arm 140 and the pawl 142 may be facilitated through the use of suitable washers (i.e. brass washers), which may also serve to center the actuator arm 140 and/or pawl 142 between the mount bridge 146 and the mount strip 148. The actuator arm 140 provides an extended portion 152 that pivotally mounts upon the mounting post 150a. The actuator arm 140 also provides at least one pawl engagement wing 154 for engaging the pawl 142 which is pivotally mounted upon the mounting post 150c. To bias the pawl 142 towards engagement with the drag gear 106, a pawl spring 160 is also provided. As shown in FIG. 6, the pawl spring 160 is supported upon mounting post 150d and provides a vertical leg 162 configured to apply a biasing force upon a first side 164 of the pawl 142 to impart the biasing force required to move the pawl 142 into engagement with the drag gear 106. The pawl 142 is configured to be engageable at a first end 156 with the drag gear 106 (as seen in FIGS. 7 and 7a), and at an opposing second end 158 with the pawl engagement wing 154 of the actuator arm 140.

Figure 7A:
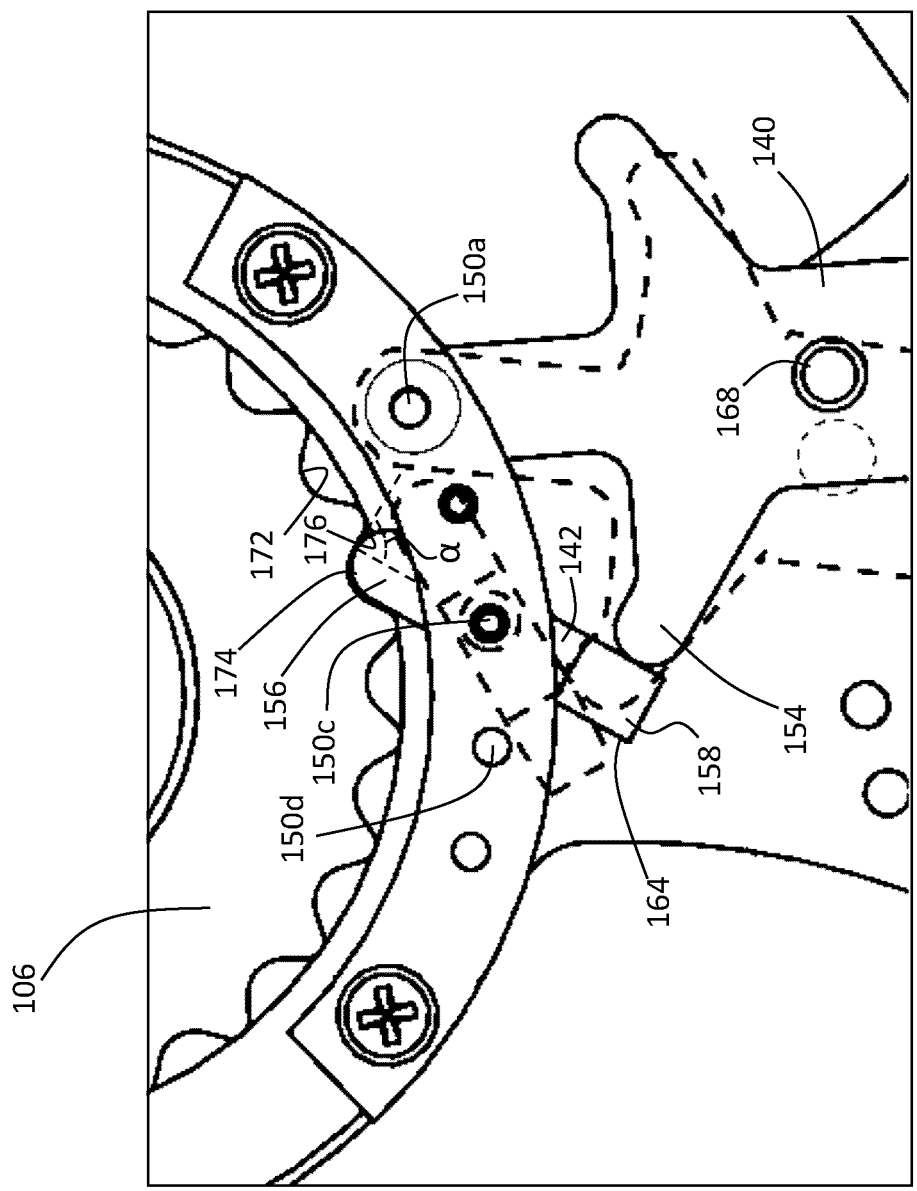
FIG. 7a is a close up view of the locking assembly shown in FIG. 7, showing additional aspects.

Having regard to FIG. 7a, the actuator arm 140 (as presented in solid lines) is shown in the second position, that is when the pawl engagement wing 154 of the actuator arm 140 directs the first end 156 of the pawl 142 to engage the drag gear 106, thus preventing rotation of the drag gear 106. More specifically, the drag gear 106 includes a plurality of teeth 178 and a plurality of valleys 172 between the teeth 178 (as is typically the case on a gear). The pawl 142 is rigid and is angled such that when the first end 156 is engaged in one of the valleys 172, the drag gear 106 can be rotated in one direction but cannot be rotated in the other due to the presence of the pawl 142. Referring to FIG. 7a, the actuator arm 140 (as presented in dashed lines) is shown in the first position, in which the pawl engagement wing 154 of the actuator arm 140 directs the first end 156 of the pawl 142 to disengage and thus be spaced-apart from the drag gear 106. Movement of the actuator arm 140 to the first position is limited by the mounting post 150*d* which engages the first side 164 of the pawl 142. To maintain the actuator arm 140 in each of these positions, the actuator arm 140 is provided with a ball plunger/ball detent arrangement. The actuator arm 140 is configured to support the ball plunger 168, while the back plate 40 provides the ball detents 170 (see FIG. 5) positioned to accord with the first and second positions of the actuator arm 140.

The engagement geometry of the first end 156 of the pawl 142 and the drag gear 106 is configured such that when the pawl 142 is pivoted by the actuator arm 140, the pawl 142 is permitted to pivot and therein disengage from the drag gear 106 without having to release any load placed upon the locking assembly. It will be appreciated that the requirement to release the load prior to disengaging the locking assembly would be particularly difficult when the fishing line is under load, particularly during the course of reeling in a fish. Accordingly, the shape of the valleys 172 of the drag gear 106 are such that the radius of the valleys 172 closely match the radius of the pawl tip 174 at the first end 156 of the pawl 142, with the outermost portion of the valley 172 being angled sufficiently to permit the pawl 142 to rotate out of engagement with the valley 172 with no movement of the drag gear 106 being needed to avoid binding therebetween. In the embodiment shown, the valleys 172 are symmetrical, and the contact angle between the contact face 176 of each tooth 178 on the drag gear 106 and the longitudinal axis of the pawl 142 is at least 91°. In some embodiments, this angle is from approximately 91° to approximately 92°.

As seen in FIG. 5, the actuator arm 140 is positioned in the backplate 20 such that a lever portion 190 of the actuator arm 140 extends through a circumferentially-extending slot 192 provided on the circumferentially-extending backplate edge wall 42. With the lever portion 190 being exposed on the exterior side of the fishing reel 10, the user is permitted to move the actuator arm 140 to the required position, that is either the second position to engage the friction mechanism, or the first position to disengage the friction mechanism. The circumferentially-extending slot 192 is dimensioned to limit movement of the actuator arm 140 when moved to the second position, generally corresponding to the second position detent 170 provided on the back plate 40 of the backplate 20. The actuator arm 140 cooperates with an actuator arm biasing member 194 that is positioned to engage an interior face 196 of the backplate edge wall 42 to urge the actuator arm 140 towards at least one of the first and second arm positions. The actuator arm biasing member 194 at least partially surrounds the lever portion 190 of the actuator arm 140 to inhibit migration of debris therebetween, that is through the circumferentially-extending slot 192 and into the interior space of the backplate 20. The actuator arm biasing member 194 also serves to center the lever portion 190 relative to the circumferentially-extending slot 192.

As seen for example in FIG. 6, the actuator arm biasing member 194 includes an outer peripheral wall 200 and an asymmetric inner wall 202. The outer peripheral wall 200 covers the circumferentially-extending slot 192, and each of the inner and outer walls 200 and 202 provide an arm pass-through aperture 204 through which the actuator arm 140 passes. Movement of the actuator arm 140 between the first and second positions causes sliding movement of the actuator arm biasing member 194 between a first biasing member position and a second biasing member position. In both the first and second biasing member positions, the actuator arm biasing member 194 covers the circumferentially-extending slot 192.

The actuator arm 140 provides a bearing surface 206 which engages the asymmetric inner wall 202 of the actuator arm biasing member 194 to urge the opposing outer peripheral wall 200 of the actuator arm biasing member 194 to cover the circumferentially-extending slot 192. In turn, the actuator arm biasing member 194 applies an inwardly directed radial force against the actuator arm 140. The asymmetric inner wall 202 is configured to require a greater force to move the actuator arm 140 in one direction relative to the other. For example, the asymmetric inner wall 202 engages the actuator arm 140 in a manner such that it is harder to push the actuator arm 140 towards the second position in which the friction mechanism is engaged, but easier to push the actuator arm 140 away from the second position, that is towards the first position where the friction mechanism is disengaged. As shown, the asymmetric inner wall 202 provides a first inner wall portion 208 and a second inner wall portion 210, where the second inner wall portion 210 is longer than the first inner wall portion 208. In the right-handed configuration shown, the shorter first inner wall portion 208 is compressed upon moving the actuator arm 140 to the second position, resulting in the higher forces required to engage the friction mechanism.

Figure 8:
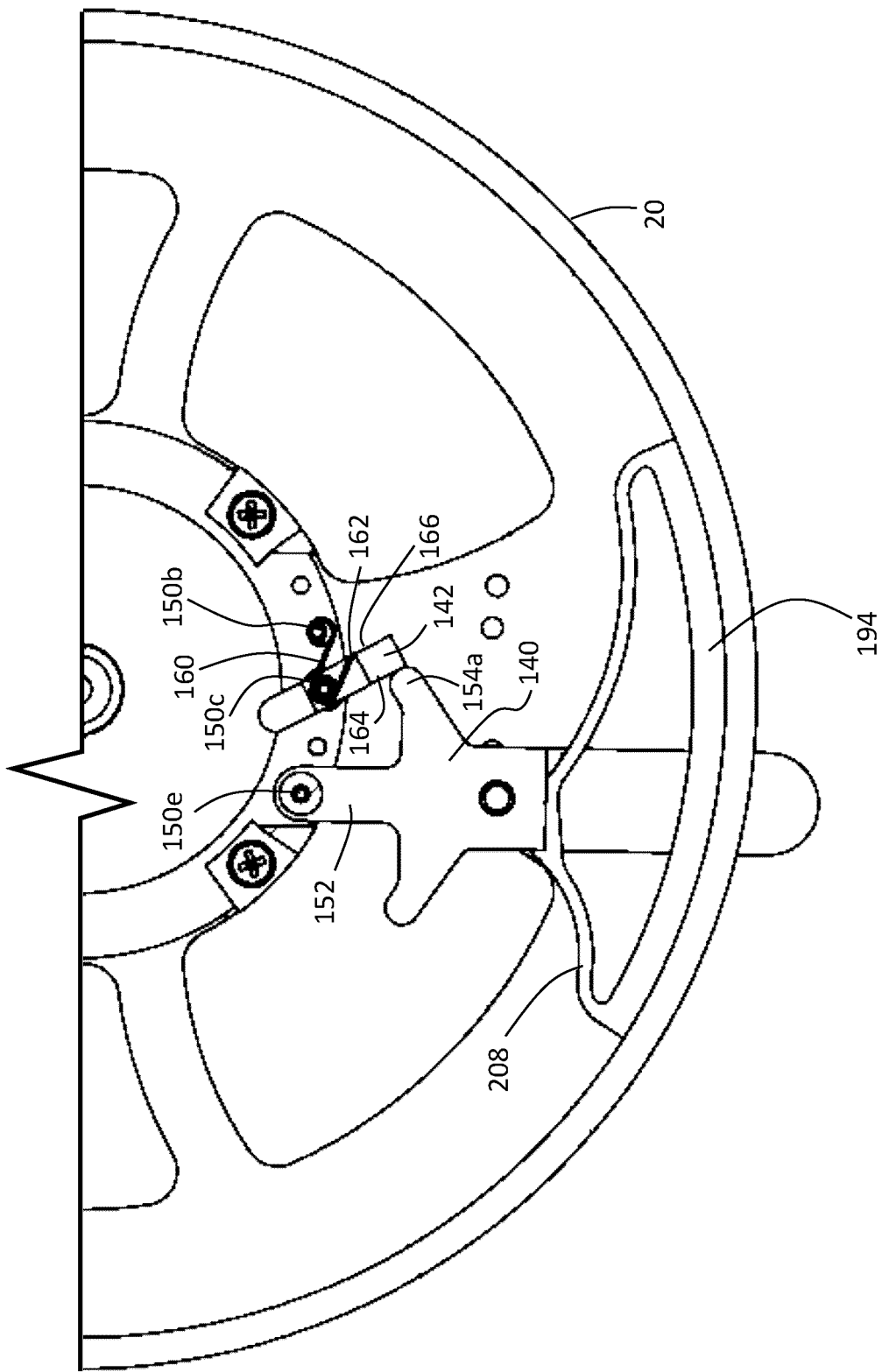
FIG. 8 is a partial front view of the backplate and locking assembly of the fishing reel shown in a left-handed configuration, in accordance with an embodiment of the disclosure.
Figure 9:
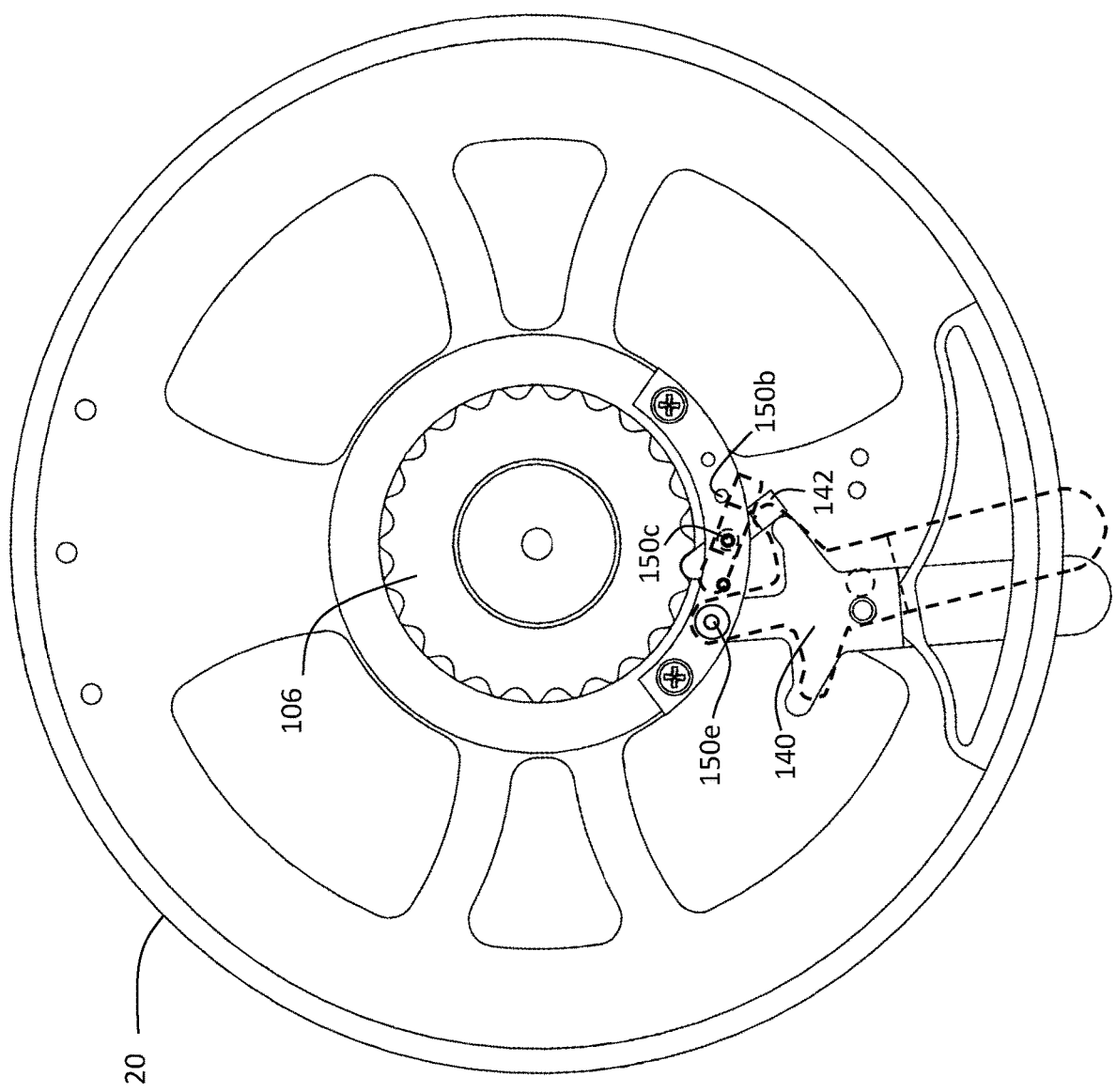
FIG. 9 is a front view of the backplate of the fishing reel according to the embodiment of FIG. 8, showing the relationship between the drag gear of the rotatable spool, and the locking assembly in the third and fourth positions.

The fishing reel 10 may be used in both a right-handed and left-handed configuration. Accordingly, as shown in FIGS. 8 and 9, the components of the friction mechanism may be installed in a second configuration corresponding to a left-handed configuration. With this arrangement, the actuator arm 140 is said to be moveable between a third position (as shown in dashed lines) and a fourth position (as shown in solid lines), wherein in the third position, the actuator arm 140 disengages the friction mechanism to permit free rotation of the spool 22 relative to the backplate 20, and in the fourth position, the actuator arm 140 actuates the friction mechanism to cause frictional engagement between the rotatable friction surface 110 of the drag pins 102 and the stationary friction surface 112 of the drag gear 106 in the second rotational direction D2. In the left-handed configuration, the extended portion 152 of the actuator arm 140 is pivotally mounted upon the mounting post 150*e*. The pawl 142 remains pivotally mounted upon the mounting post 150*c*, while the pawl spring 160 is supported upon mounting post 150*b*, which also serves to limit movement of the pawl 142 by engaging the second side 166 of the pawl 142 when the actuator arm 140 is moved to the third position. As shown, the vertical leg 162 of the pawl spring 160 applies the biasing force upon a second side 166 of the pawl 142 to impart the biasing force required to move the pawl 142 into engagement with the drag gear 106. To permit right-handed/left-handed changeability, the actuator arm 140 is configured with two pawl engagement wings, the first wing 154 configured for engagement with the second side 166 of the pawl 142 as shown in FIG. 6, and a second wing 154*a* configured for engagement with the first side 164 of the pawl 142 as shown in FIG. 8. Similar to the right-handed configuration, the circumferentially-extending slot 192 serves to limit movement of the actuator arm 140 when moved to the fourth position, generally corresponding to the fourth position detent 170*a* provided on the back plate 40 of the backplate 20. The actuator arm biasing member 194 is installed in a reverse orientation compared to the left-handed configuration, such that the shorter first inner wall portion 208 is compressed upon moving the actuator arm 140 to the fourth position, resulting in the higher forces required to engage the friction mechanism.

Figure 10:
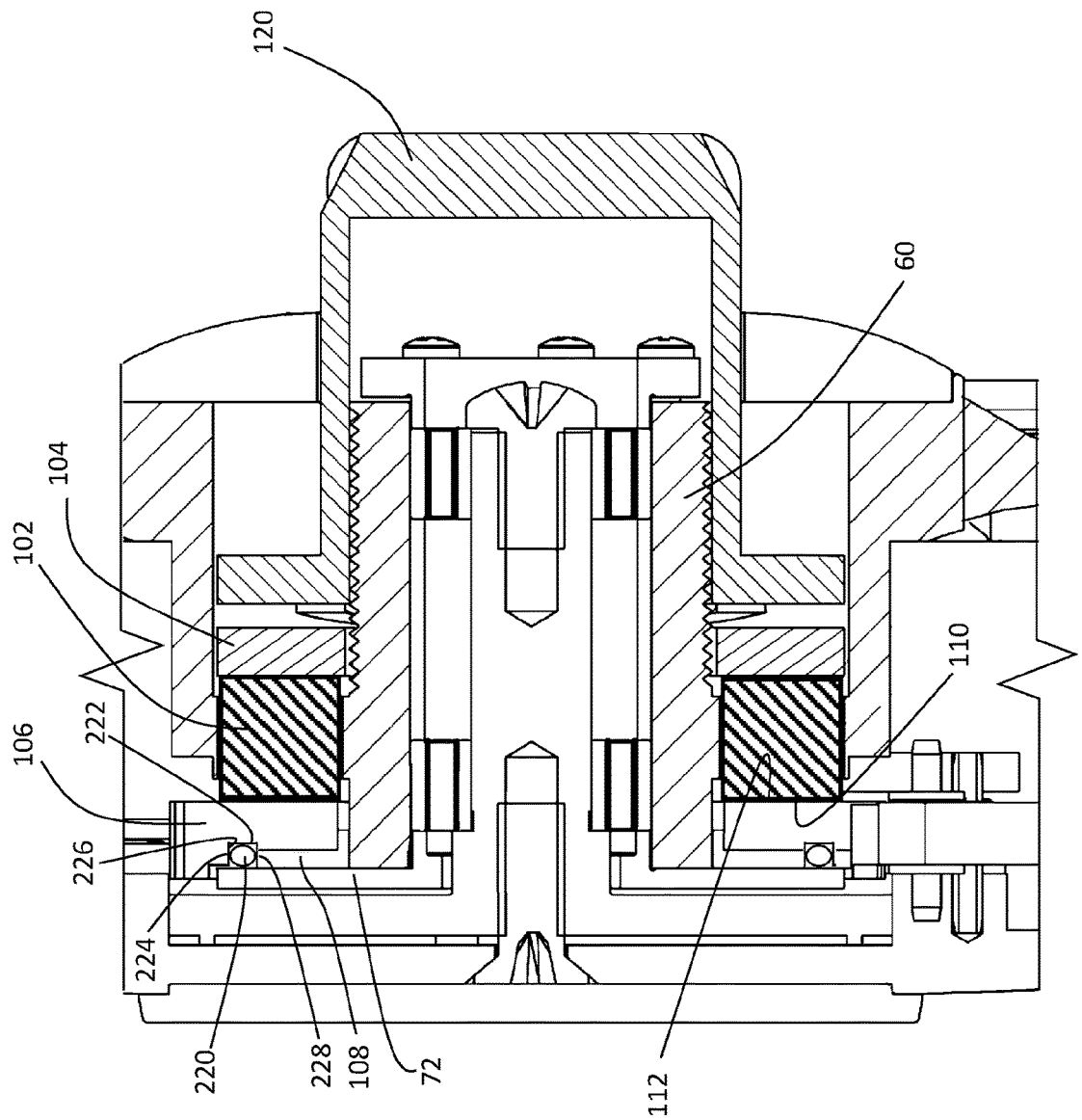
FIG. 10 is a partial side section view of the fishing reel according to an alternative embodiment of the disclosure, incorporating an additional friction element to increase the available drag.
Figure 11:
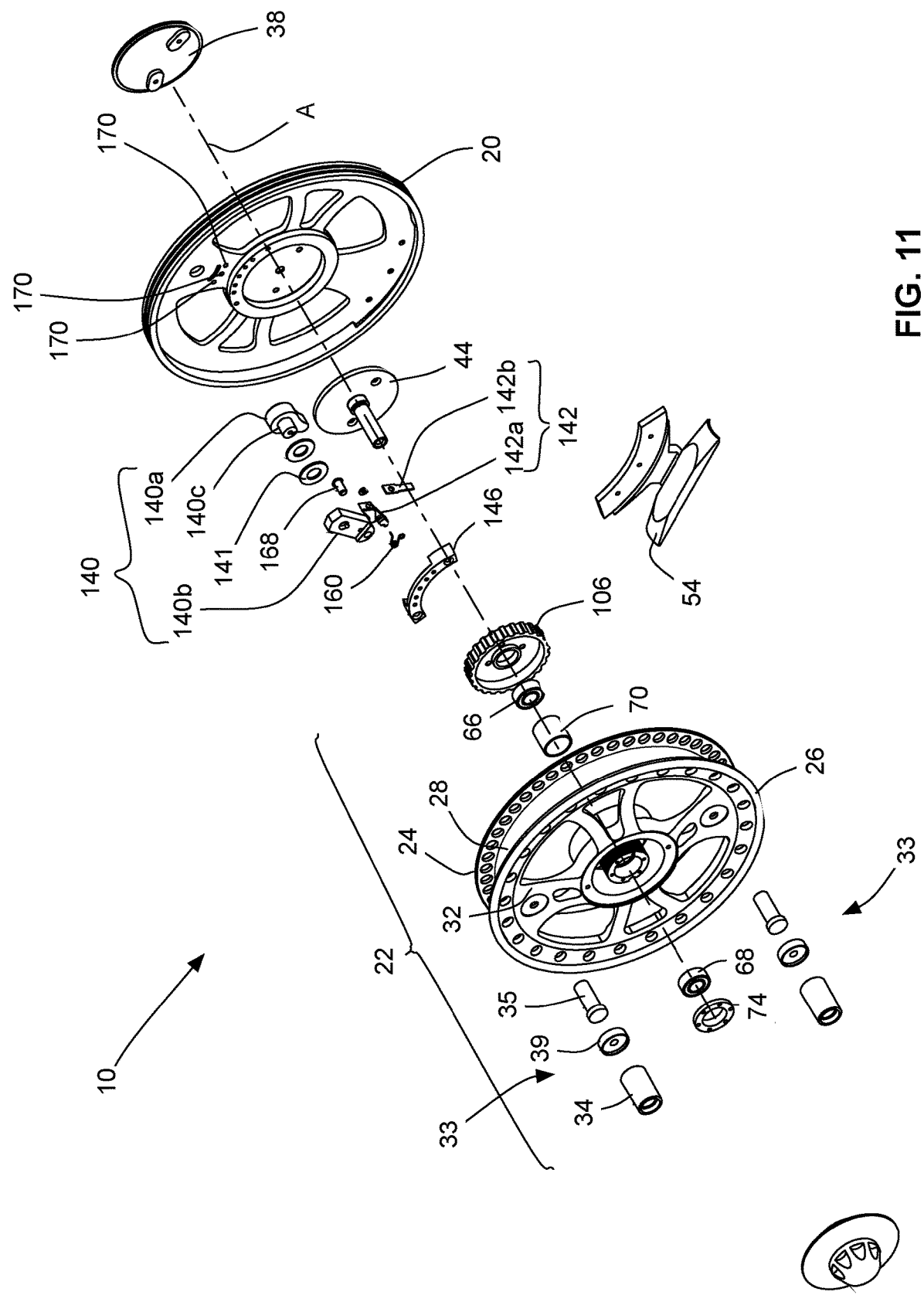
FIG. 11 is a perspective exploded view of another embodiment of a fishing reel in accordance with the disclosure.
Figure 12:
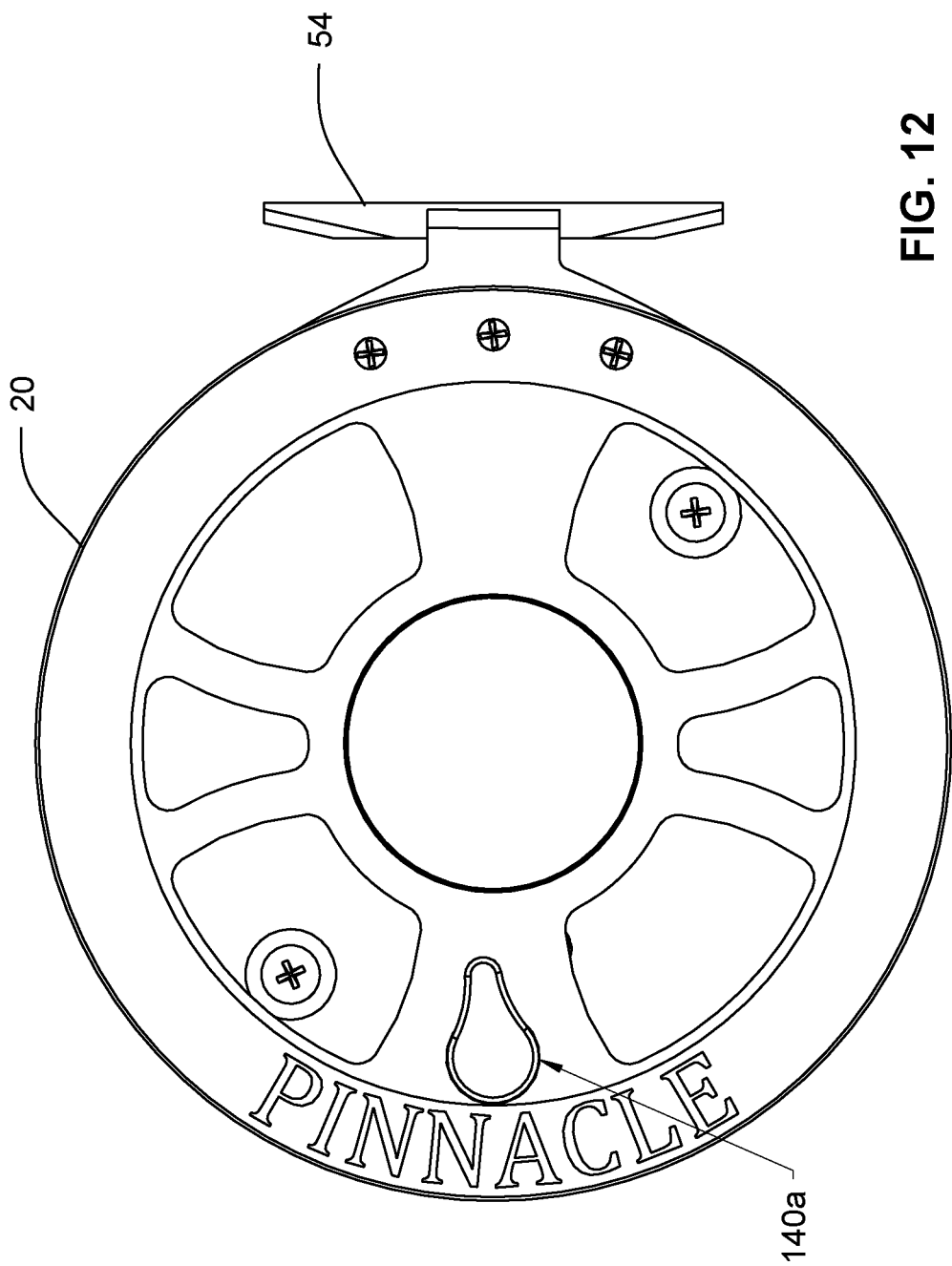
FIG. 12 is a plan view of the embodiment shown in FIG. 11.
Figure 13:
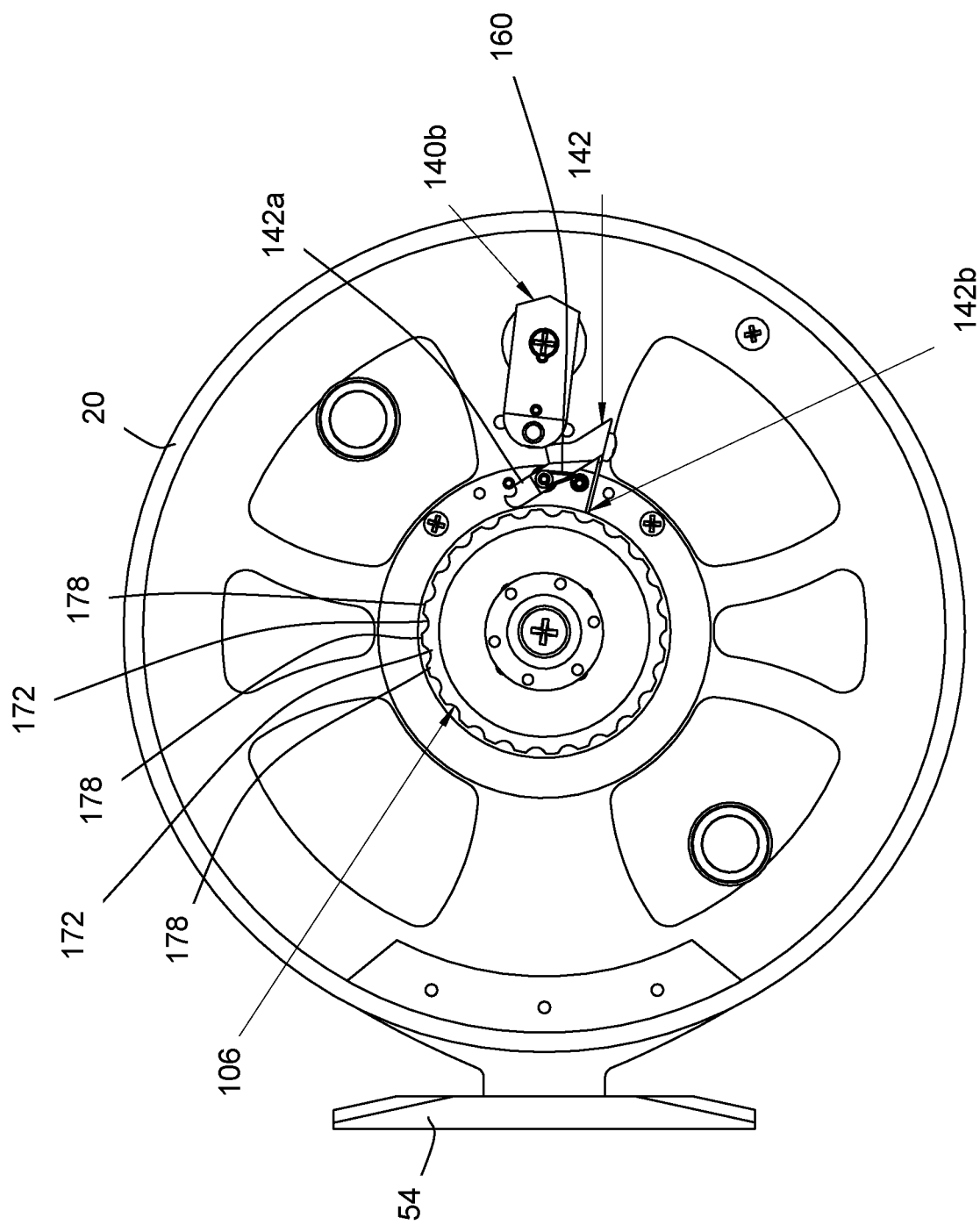
FIG. 13 is a plan view of a portion of the embodiment shown in FIG. 11, in a free rotation position.
Figure 14:
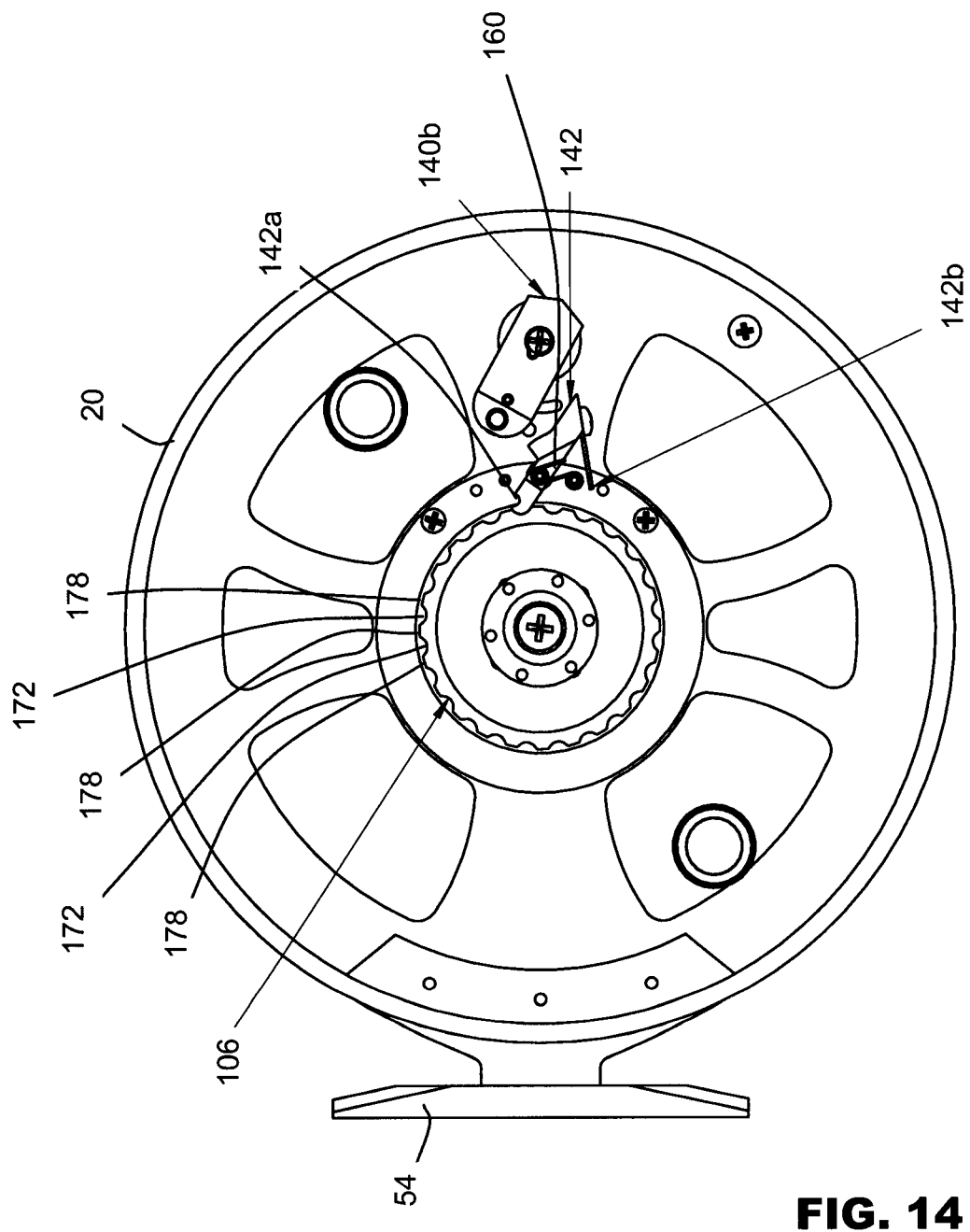
FIG. 14 is a plan view of a portion of the embodiment shown in FIG. 11, in a clicker position.
Figure 15:
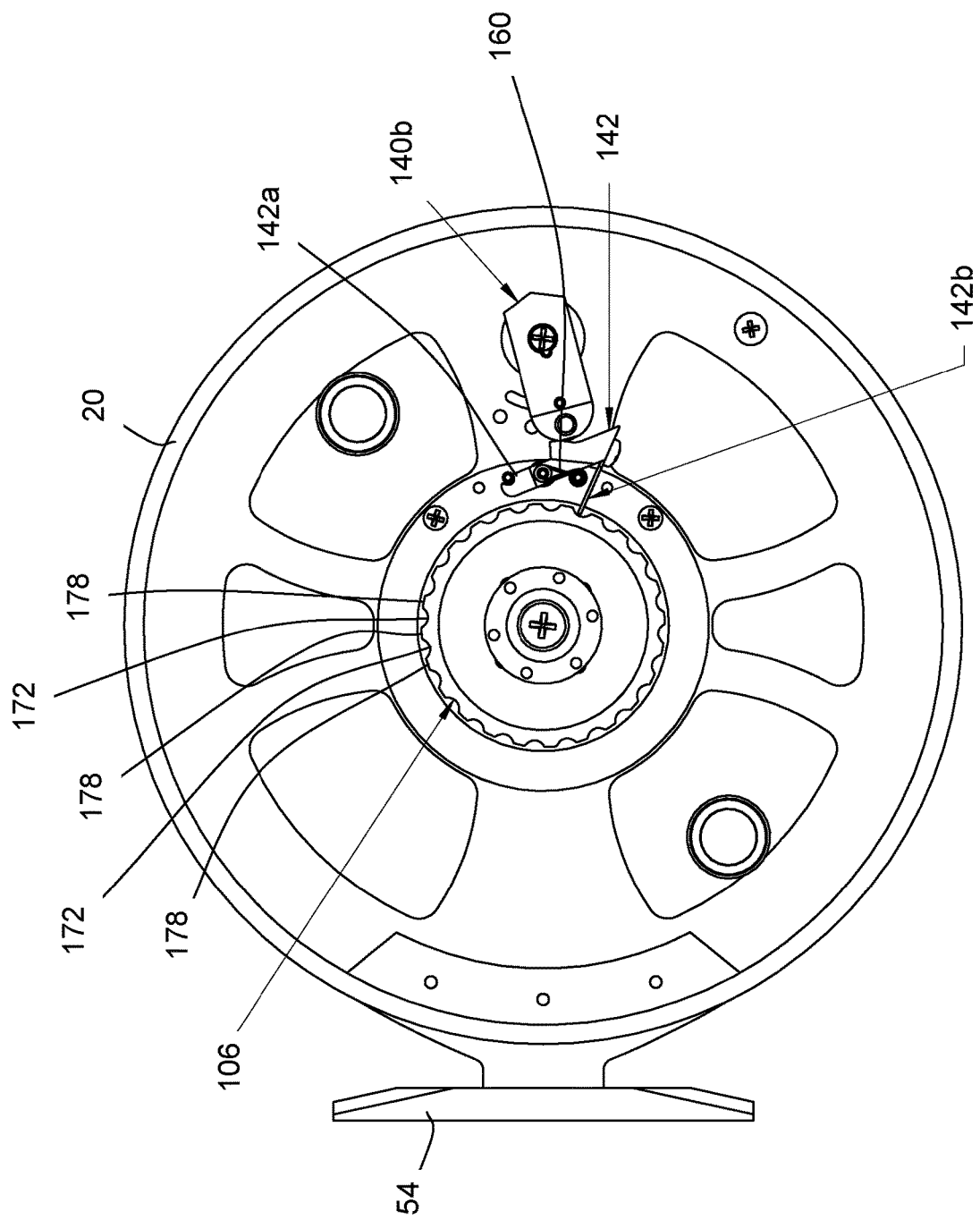
FIG. 15 is a plan view of a portion of the embodiment shown in FIG. 11, in a locking position.

In some embodiments, the fishing reel may incorporate additional friction elements to provide a greater range of available drag when the friction mechanism is engaged. In the embodiment shown in FIG. 10, the friction mechanism incorporates an additional friction element 220 positioned between the drag gear 106 and the first clamping member 72. The friction element 220 may be provided in the form of an o-ring, and may be formed of any suitable material, including but not limited to thermoplastic, elastomeric and other polymeric compositions. For example, the friction element 220 may be formed of Viton, Nitril or EPDM (ethylene propylene diene terpolymer).

The friction element 220 is seated in a channel 222 formed in the drag gear 106, and is therein supported on its outside wall surface 224 by the channel wall 226, and on its inside wall surface 228 by the friction washer 108. The friction element 220 is sized to present a thickness that is greater than the friction washer, such that upon moving the tension knob to increase the compressive forces in the friction mechanism, the friction element 220 is compressed between the drag gear 106 and the first clamping member 72. The additional friction created by the engagement between the o-ring and the opposing drag gear 106 and first clamping member 72 increases the available drag provided by the fishing reel.

While a variety of materials (i.e. aluminum, stainless steel, etc.) may be used for the metal components of the fishing reel, in some embodiments, brass may be incorporated for its lubricating properties. For example, in some embodiments, brass may be used to form the drag gear 106 and the first clamping member 72 components of the fishing reel 10.

Reference is made to FIGS. 11-15 which shows an exploded view of another embodiment of the fishing reel 10. The embodiment shown in FIG. 11 may be similar to the embodiment shown in FIGS. 1-10, with one difference being that the assembly 10 in FIG. 11 includes an actuator arm 140 that is positionable in three positions instead of two positions. The positions include a first position shown in FIG. 13 (also referred to as a free-rotation position) in which the spool 22 rotates with relatively little friction in either direction, a second position shown in FIG. 14 (also referred to as a clicker position) in which there is some resistance to payout of the fishing line, and a third position shown in FIG. 15 (also referred to as a locking position) in which the spool 22 can be reeled in, but cannot pay out line.

In the embodiment shown in FIGS. 11-15, the drag gear 106 always rotates with the spool 22—it is fixedly connected to the spool 22. The actuator arm 140 includes an external arm portion 140a that is on an exterior side of the backplate 20, and an internal arm portion 140b that is on an interior side of the backplate 20 and which engages the pawl 142. The internal arm portion 140b may be fixedly connected to the external arm portion 140a by means of a shaft 140c that extends between them. The shaft 140c passes through the backplate 20 and pivotally supports the actuator arm 140 thereon. Washers 141 may provide bearing surfaces to protect the actuator arm portions 140a and 140b from rubbing directly on the backplate 20. The pawl 142 itself includes a first pawl portion 142a that is used when the actuator arm 140 is in the locking position, and a second pawl portion 142b that is used when the actuator arm 140 is in the clicker position, as described below. When the actuator arm 140 is in the free rotation position (FIG. 13), the actuator arm 140 moves the pawl 142 to a position wherein the pawl 142 is completely disengaged from the drag gear 106 (and from any other portion of the spool 22) such that the rotation of the spool 22 can be carried out in either the first or second rotational directions with relatively little friction. This position may be used when the user wishes to control the reel by palming the spool 22.

When the actuator arm 140 is in the clicker position, the second pawl portion 142b is engaged with the drag gear 106. The second pawl portion 142b may be a leaf spring may therefore be configured to flex out of the way as teeth 178 of the drag gear go by during rotation of the spool 22 in both rotational directions. As each tooth 178 goes by the second pawl portion 142b resiliently snaps back into the next valley 172 that follows. This results in a 'click' sound. As a result this position of the actuator arm 140 may be referred to, as noted above, as a clicker position. Because the second pawl portion 142b is a leaf spring, however, and must flex out of the way as the teeth 178 go by, the second pawl portion 142b resists rotation of the drag gear 106 and therefore of the spool 22. Thus, when clicker position of the actuator arm 140 may also be referred to as a drag position. The amount of resistance force applied by the second pawl portion 142b on the drag gear 106 can be selected by providing the second pawl portion 142b with a selected spring rate (e.g. by controlling one or more of the type of material used to form it, the thickness of the material used to form it, the length of it, and other factors). This position may be used, for example, when the user wishes to line a fishing rod, by providing sufficient resistance to pay out of the line that the user can pull line off as needed and thread the line through the guides on the rod without fear of the spool over-rotating when the line is pulled, thereby paying out more line than the user needs which would then need to be rewound on the spool 22.

Put another way, when in the drag position, the actuator arm 140 (and the pawl 142) permits rotation of the spool 22 in the pay out direction with a first resistance (due to the resistance to flexing of the leaf spring that is part of the second pawl portion 142b), and when in the free rotation position, the actuator arm 140 (and the pawl 142) permits rotation of the spool 22 in the pay out direction with a second resistance that is lower than the first resistance. In some embodiments the second resistance may be sufficiently low that a person may be able to apply a rotary force to the spool 22 by hand and for the spool to rotate for one or more minutes when in the actuator arm 140 is in the free rotation position.

When the actuator arm 140 is in the third position, the actuator arm 140 holds the pawl 142 such that the first pawl portion 142a engages the drag gear 106. The first pawl portion 142a rests at such an angle that rotation of the drag gear 106 (and therefore the spool 22) can take place in the second direction D2 (e.g. the direction for winding line onto the spool 22, also referred to as the winding direction) during which the teeth 178 lift up the first pawl portion 142a as they go by. However, rotation of the drag gear 106 (and therefore the spool 22) cannot take place in the first direction (e.g. the pay out direction), because the first pawl portion 142a is rigid and is trapped in the valley 172 in which it is engaged. This position is useful for when the user wishes to pack the rod so as to transport it to another location. To do this, the user can position the actuator arm 140 in the locking position, and then they may hook the fishing hook at the end of the line on some portion of the rod (e.g. one of the guides of the rod). The user can then wind the fishing line onto the spool 22 until the line is somewhat taut, thereby ensuring that the hook remains hooked on the guide. Because the spool 22 is prevented by engagement of the pawl 142 with one of the valleys 172 from rotating in the pay out direction 10, the hook 206 remains hooked where the user had intended, so that the rod is safe for transport.

The actuator arm 140 may be captured and held at each of its three positions by means of a ball plunger 168 on the actuator arm 140 and three suitably positioned ball detents 170 on the backplate 20.

The pawl 142 may be said to be positioned by the actuator arm 140 in any of three positions, namely a free rotation position corresponding to the free rotation position of the actuator arm 140, a drag or clicker position corresponding to the drag or clicker position of the actuator arm 140, and a locking position corresponding to the locking position of the actuator arm 140, The pawl 142 is biased towards the locking position by the pawl biasing member 160 (i.e. towards insertion of the first pawl portion 142a into one of the valleys 172 of the drag gear 106).

FIG. 16 shows a fishing rod 300 with the fishing reel 10 mounted thereon and with the fishing rod 300 ready for transport having been packed as described above. The foot 54 of the fishing reel 10 is shown mounted to the rod 300, and may be mounted using any suitable means such as by threaded fasteners. In FIG. 16, a fishing hook is shown at 302, a fishing line is shown at 304, and guides on the rod 300 are shown at 306. The fishing reel 10 may be either the embodiment shown in FIGS. 1-10, or the embodiment shown in FIGS. 11-15. For transport of the rod 300 when equipped with the reel 10 shown in FIGS. 1-10, the tension in the fishing line 304, may be maintained at least somewhat, by positioning the actuator arm 140 in the drag position and adjusting the drag force to be sufficiently high to resist payout of the line with a suitable resistance force.

Throughout the present disclosure, reference is made to the actuator arm 140. It will be understood that the arm 140 may have any suitable shape and need not have an elongate shape that is traditionally considered to resemble an arm.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A fishing reel, comprising:
a backplate that is mountable to a fishing rod;
a spool that is rotatably mounted to the backplate, wherein the spool has a circumferentially-extending line storage channel configured for storage of fishing line;
a friction mechanism including at least one rotatable friction surface that is rotatable with the spool and that is engageable with a stationary friction surface during rotation of the spool relative to the backplate; and
an actuator arm that is movable between a first position and a second position, wherein in the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction,
wherein the backplate has a circumferentially extending backplate edge wall that includes a circumferentially extending slot, wherein the actuator arm is mounted to the backplate and is configured to extend through the circumferentially extending slot to permit movement of the actuator arm between the first and second actuator arm positions.

2. A fishing reel as claimed in claim 1, further comprising an adjustment member that is movable to adjust a friction force applied between the rotatable friction surface and the stationary friction surface during rotation of the spool.

3. A fishing reel as claimed in claim 1, wherein the backplate provides a spindle that includes a plate portion that is mountable in a seat in the backplate, and a shaft portion having at least a selected concentricity configured to support a bearing assembly provided in a hub of the spool.

4. A fishing reel as claimed in claim 1, wherein the circumferentially-extending line storage channel configured for storage of fishing line and defined by a first flange wall, a second flange wall and a channel bottom wall.

5. A fishing reel as claimed in claim 4, wherein the channel bottom wall and at least one of the first and second flange walls contain a plurality of drainage apertures positioned to permit the drainage of liquids from within the spool to an exterior of the spool.

6. A fishing reel as claimed in claim 1, wherein the friction mechanism includes a selectively lockable rotatable drag gear arranged on a first side of a central hub of the spool, and a plurality of drag pins arranged on a second side of the hub, and wherein the drag pins provide the at least one rotatable friction surface that is rotatable with the spool, and the drag gear provides the stationary friction surface.

7. A fishing reel as claimed in claim 6, further comprising a friction washer positioned between the drag gear and a first clamping member for retaining the drag gear on the hub.

8. A fishing reel as claimed in claim 7, further comprising a friction element positioned between the drag gear and the first clamping member.

9. A fishing reel according to claim 8, wherein the friction element is provided in the form of an o-ring.

10. A fishing reel according to claim 9, wherein the o-ring is formed of a thermoplastic or elastomeric material.

11. A fishing reel, comprising:
a backplate that is mountable to a fishing rod;
a spool that is rotatably mounted to the backplate, wherein the spool has a circumferentially-extending line storage channel configured for storage of fishing line;
a friction mechanism including at least one rotatable friction surface that is rotatable with the spool and that is engageable with a stationary friction surface during rotation of the spool relative to the backplate; and
an actuator arm that is movable between a first position and a second position, wherein in the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction,
further comprising an actuator arm biasing member that is positioned to engage an interior face of the backplate edge wall to urge the actuator arm towards at least one of the first and second arm positions, wherein the actuator arm biasing member at least partially surrounds the actuator arm to inhibit migration of debris therebetween, and covers the slot to inhibit migration of debris therebetween.

12. A fishing reel as claimed in claim 11, wherein the actuator arm urges the actuator arm biasing member to cover the slot.

13. A fishing reel as claimed in claim 11, wherein the actuator arm biasing member has an outer peripheral wall that covers the slot, and further has an arm pass-through aperture through which the actuator arm passes, wherein movement of the actuator arm between the first and second arm positions causes sliding movement of the actuator arm biasing member between first and second biasing member positions, wherein the actuator arm biasing member covers the slot in both the first and second biasing member positions.

14. A fishing reel as claimed in claim 11, wherein the actuator arm biasing member is asymmetric in that it is harder to push the actuator arm towards the second position in which the actuator arm actuates the friction mechanism, but is easier to push the actuator arm away from the second position to disengage the friction mechanism.

15. A fishing reel, comprising:
a backplate that is mountable to a fishing rod;
a spool that is rotatably mounted to the backplate, wherein the spool has a circumferentially-extending line storage channel configured for storage of fishing line;
a friction mechanism including at least one rotatable friction surface that is rotatable with the spool and that is engageable with a stationary friction surface during rotation of the spool relative to the backplate; and
an actuator arm that is movable between a first position and a second position, wherein in the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction,
wherein the actuator arm controls the position of a pawl and wherein the stationary friction surface is provided on a drag gear, wherein, when the actuator arm is in the first position, the pawl is spaced from the gear, thereby permitting the gear to rotate with the spool, and when the actuator arm is in the second position the pawl is engaged with the gear preventing rotation of the gear in at least a first rotational direction, thereby causing frictional engagement between the rotatable friction surface and the gear during rotation of the spool in the first rotational direction.

16. A fishing reel, comprising:
a backplate that is mountable to a fishing rod;
a spool that is rotatably mounted to the backplate, wherein the spool has a circumferentially-extending line storage channel configured for storage of fishing line;
a friction mechanism including at least one rotatable friction surface that is rotatable with the spool and that is engageable with a stationary friction surface during rotation of the spool relative to the backplate; and
an actuator arm that is movable between a first position and a second position, wherein in the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction,
wherein the actuator arm is mountable to the backplate for movement between a third position and a fourth position, wherein in the third position, the actuator arm disables the friction mechanism to permit free rotation of the spool relative to the backplate, and in the fourth position, the actuator arm actuates the friction mechanism to cause frictional engagement between the rotatable friction surface and the stationary friction surface during rotation of the spool in a second rotational direction that is opposite the first rotational direction.

17. A fishing reel, comprising:
a backplate that is mountable to a fishing rod;
a spool that is rotatably mounted to the backplate, wherein the spool has a circumferentially-extending line storage channel configured for storage of fishing line;
a friction mechanism including at least one rotatable friction surface that is rotatable with the spool and that is engageable with a stationary friction surface during rotation of the spool relative to the backplate; and
an actuator arm that is movable between a first position and a second position, wherein in the first position, the actuator arm disables the friction mechanism to permit free rotation of the spool relative to the backplate, and in the second position, the actuator arm actuates the friction mechanism to cause frictional engagement between the rotatable friction surface and the stationary friction surface during rotation of the spool in a first rotational direction,
wherein the backplate provides a spindle that includes a plate portion that is mountable in a seat in the backplate, and a shaft portion having at least a selected concentricity configured to support a bearing assembly provided in a hub of the spool,
wherein the bearing assembly that carries the spool and is supported upon the shaft portion of the spindle includes a first bearing, a second bearing and a bearing spacer positioned therebetween.

18. A fishing reel as claimed in claim 17, wherein each of the first and second bearings has an inner race and an outer race, and wherein the fishing reel further comprises first and second clamping members that retain the bearing assembly in a bearing housing provided by the hub of the spool, wherein the first and second clamping members clamp the first and second bearings axially on the outer race of each of the first and second bearings only.

19. A fishing reel, comprising:
a backplate that is mountable to a fishing rod;
a spool that is rotatably mounted to the backplate, wherein the spool has a circumferentially-extending line storage channel configured for storage of fishing line; and
an actuator arm that is movable between a locking position, a drag position and a free rotation position, wherein in the locking position, the actuator arm prevents rotation of the spool in a pay out direction, wherein in the drag position, the actuator arm permits rotation of the spool in the pay out direction with a first resistance, and wherein in the free rotation position, the actuator arm permits rotation of the spool in the pay out direction with a second resistance that is lower than the first resistance,
further comprising a pawl that is pivotally connected to the backplate and a drag gear having a plurality of teeth and a plurality of valleys between the plurality of teeth, wherein the drag gear that is mounted to the spool for rotation therewith, wherein in the free rotation position the actuator arm is positioned to disengage the pawl entirely from the drag gear, and in both the drag and locking positions the actuator arm positions the pawl to engage the drag gear.

20. A fishing reel as claimed in claim 19, wherein the pawl includes a first pawl portion and a second pawl portion, wherein, in the locking position, the actuator arm positions the pawl such that the first pawl portion engages the drag gear, and in the drag position the actuator arm positions the pawl such that the second pawl portion engages the drag gear.

21. A fishing reel as claimed in claim 19, wherein the first pawl portion is rigid, and when the actuator arm is in the locking position, the first pawl portion is angled to permit the drag gear to rotate in the winding direction but is angled to prevent rotation of the drag gear in the pay out direction.

22. A fishing reel as claimed in claim 19, wherein the second pawl portion includes a leaf spring that engages the valleys in the drag gear and that flexes out of the way by movement of the teeth on the drag gear therepast, thereby providing the first resistance to rotation of the drag gear.

23. A fishing reel as claimed in claim 22, wherein the leaf spring flexes out of the way by movement of the teeth on the drag gear therepast in both the pay out and winding directions, thereby providing the first resistance to rotation of the drag gear in both the pay out and winding directions.

\* \* \* \* \*